(12) United States Patent
Hu

(10) Patent No.: US 10,406,984 B2
(45) Date of Patent: Sep. 10, 2019

(54) LIVING STORAGE STRUCTURE FOR A VEHICLE

(71) Applicant: Nissan North America, Inc., Franklin, TN (US)

(72) Inventor: Teng Hu, San Diego, CA (US)

(73) Assignee: Nissan North America, Inc., Franklin, TN (US)

( * ) Notice: Subject to any disclaimer, the term of this patent is extended or adjusted under 35 U.S.C. 154(b) by 63 days.

(21) Appl. No.: 15/668,477

(22) Filed: Aug. 3, 2017

(65) Prior Publication Data
US 2019/0039525 A1    Feb. 7, 2019

(51) Int. Cl.
*B60R 7/00* (2006.01)
*B60R 7/04* (2006.01)

(52) U.S. Cl.
CPC .............. *B60R 7/005* (2013.01); *B60R 7/043* (2013.01)

(58) Field of Classification Search
None
See application file for complete search history.

(56) References Cited

U.S. PATENT DOCUMENTS

| | | | |
|---|---|---|---|
| 6,390,878 B1 | 5/2002 | Zhou et al. | |
| 6,834,797 B2 | 12/2004 | Gough et al. | |
| 7,967,339 B2* | 6/2011 | Usoro | B60R 22/03 180/268 |
| 8,061,550 B2 | 11/2011 | Browne et al. | |
| 8,485,581 B2 | 7/2013 | McKnight et al. | |
| 9,914,344 B1* | 3/2018 | Stull | B60J 7/1204 |
| 2003/0080131 A1* | 5/2003 | Fukuo | B60R 7/04 220/264 |
| 2005/0230991 A1* | 10/2005 | Ichioka | B60R 7/04 296/37.1 |
| 2009/0108607 A1* | 4/2009 | Browne | B60N 3/023 296/1.02 |
| 2009/0218858 A1* | 9/2009 | Lawall | B60N 2/4235 297/216.1 |
| 2018/0118122 A1* | 5/2018 | Rueda Musi | E05B 85/06 |

* cited by examiner

*Primary Examiner* — David E Allred
(74) *Attorney, Agent, or Firm* — Young Basile Hanlon & MacFarlane, P.C.

(57) ABSTRACT

A storage structure for mounting on an interior mounting surface of a vehicle is described. The storage structure includes a sheet of flexible fabric that forms a pocket on the interior mounting surface. The fabric pocket can be opened and closed with one or more shape memory alloy actuators. The interior mounting surface can be a seatback, door trim, a wall of a cargo area, etc.

17 Claims, 4 Drawing Sheets

LIVING STORAGE STRUCTURE FOR A VEHICLE

TECHNICAL FIELD

The disclosure relates to storage in a vehicle, and in particular to using a shape-memory alloy as an actuator for a living storage structure for a seatback, the door trim, a cargo area, or other locations in a vehicle.

BACKGROUND

It is common for a vehicle to include storage at various locations. One common storage means for vehicle seatbacks is an elastic fabric pocket. In an elastic fabric pocket, the fabric may be sown around three sides to form an open pocket in the top. The top has an elastic extending between the two vertical sides in an area of the open pocket. Other storage means include nets or hard plastic storage.

BRIEF SUMMARY

Disclosed herein are embodiments of living storage structures and vehicles with living storage structures. The term living is used to reflect that the structure can operate to open, close, or both without manual operation of a user. The living storage structures may also be referred to herein as pockets or storage structures.

One aspect of a vehicle described herein includes a mounting surface within an interior of the vehicle, and a storage structure affixed to the mounting surface. The storage structure can include a sheet of material secured to the mounting surface and forming a pocket for the mounting surface, a rigid arch component having inner ends extending between pivot points at the mounting surface that are on opposing sides of the pocket and having an outer end to which the sheet of material is secured, and an actuator assembly coupled to the outer end of the rigid arch component for pivoting movement of the rigid arch component, wherein the rigid arch component pivots about the pivot points between a closed position where the outer end of the rigid arch component is adjacent to the mounting surface to close the pocket and an open position that opens the pocket.

Another aspect of a vehicle described herein includes a vehicle component forming a mounting surface within an interior of the vehicle and a storage structure affixed to the mounting surface. The storage structure can include a sheet of material secured to the mounting surface along three sides and having an aperture along a fourth side, a closure device secured to the sheet of material and having a first outer end and a second outer end extending horizontally in a direction along the aperture, and an actuator assembly comprising an actuator formed of a shape memory material that extends from the closure device to a bottom of the sheet of material where the sheet of material is secured to the mounting surface, the shape memory material contracting responsive to application of an energy source to pull the closure device from a first position that closes the aperture to a second position that allows access through the aperture.

A component for a vehicle having a mounting surface for a storage structure, where the mounting surface forms an interior surface with the vehicle, is also described. The storage structure can include flexible fabric forming a pocket on the mounting surface, a rigid arch component having a first leg extending from a first pivot point to an outer end and a second leg extending from a second pivot point to the outer end, the first pivot point and the second pivot point located at the mounting surface, and the flexible fabric having a portion secured to the outer end, and a first actuator formed of a shape memory material extending between the bottom of the pocket and the outer end of the rigid arch component for pivoting movement of the rigid arch component, the shape memory material contracting responsive to application of an energy source to pivot the rigid arch component about the first pivot point and the second pivot point from a closed position where the outer end is adjacent to the mounting surface, closing the pocket, to an open position wherein the outer end is spaced apart from the mounting surface, opening the pocket.

Variations in these and other aspects of the disclosure will be described in additional detail below.

BRIEF DESCRIPTION OF THE DRAWINGS

The description herein makes reference to the accompanying drawings wherein like referenced numerals refer to like parts throughout the several views unless otherwise noted. In accordance with common practice, elements within the figures may not be drawn to scale.

DETAILED DESCRIPTION

The living storage structures described herein open and retract in a flexible and seamless way, and can provide expandable space using, e.g., flexible material. They allow for better usage of space in vehicle, such as the interior cabin of the vehicle, when not in use. Further, the living storage structures described herein may also be more aesthetically pleasing than current structures when not in use.

Figure 1:
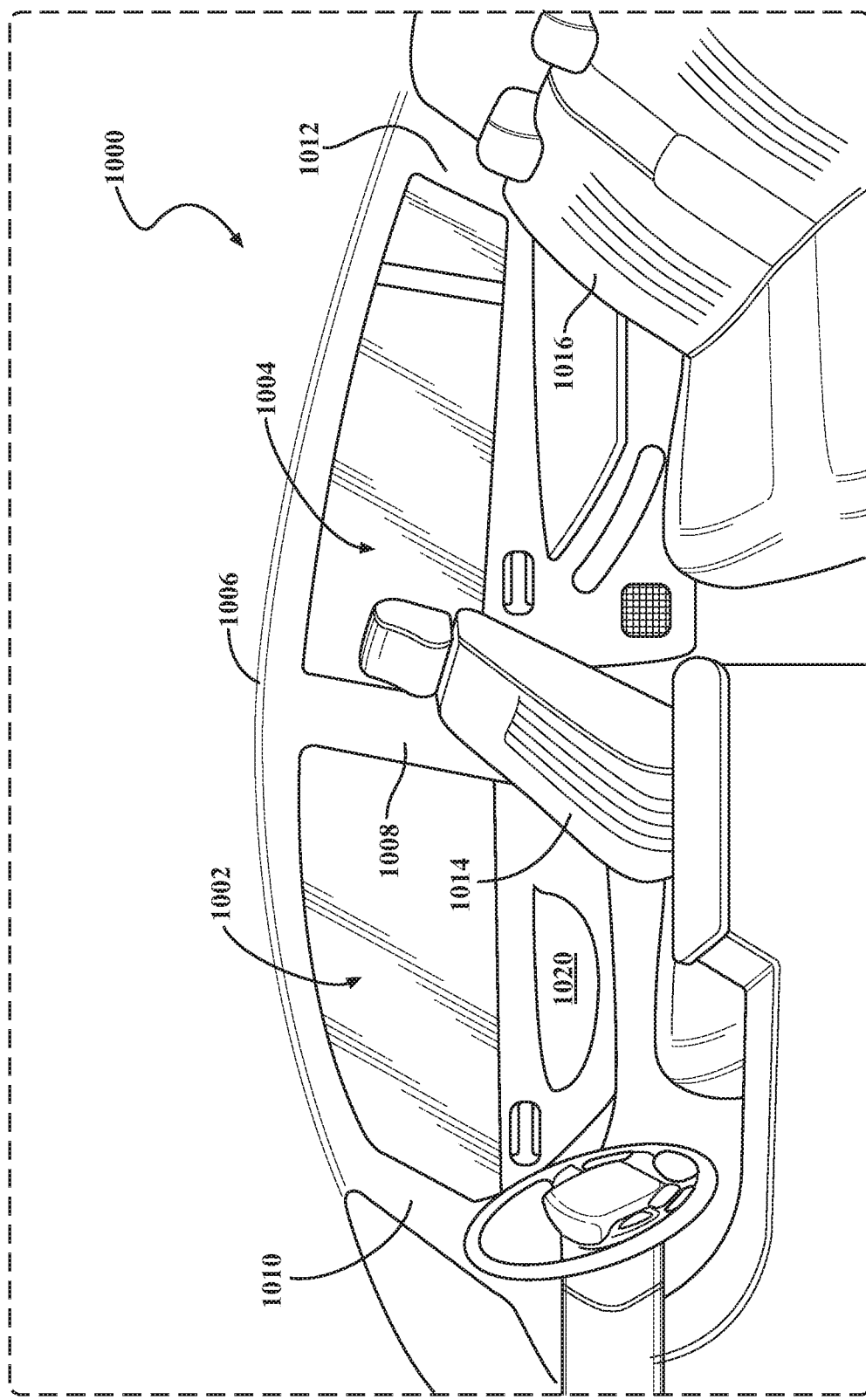
FIG. 1 is a side view of an interior of a vehicle having a mounting surface supporting a storage structure.

The storage structures may be incorporated at any location within the interior of a vehicle, such as the vehicle 1000 shown, in part, in FIG. 1. The vehicle 1000 may include a number of different components that will provide a mounting surface upon which to affix a storage structure when incorporated into the vehicle 1000. A component that can provide a mounting surface is a front door 1002, a rear door 1004, or both. Another example of a component that can provide a mounting surface is a roof rail 1006 that extends along the longitudinal direction of the vehicle 1000, above the front door 1002 and the rear door 1004. The front door 1002 and the rear door 1004 can be separated from one another by an upright interior pillar component commonly referred to as a B-pillar 1008 that extends from the beltline to the roof rail 1006. An upright front component commonly referred to as an A-pillar 1010 is disposed forward of the front door 1002. An upright rear component commonly referred to as a C-pillar 1012 is disposed rearward of the rear door 1004. In this description, references to components of a vehicle generally and to specific components may be understood as encompassing underlying structural components as well as any panels, upholstery, or trim pieces that can form the mounting surface.

In addition to the above-described body components of the vehicle 1000, other components of the vehicle 1000 can provide a mounting surface within the interior of the vehicle 1000 upon which a storage structure may be affixed. For example, front seats 1014 are positioned adjacent to the front door 1002, and rear seats 1016 are positioned adjacent to the rear door 1004. The backrest of a front seat 1014, a rear seat 1016, or both a front seat 1014 and a rear seat 1016 can provide a respective mounting surface. More specifically, a respective mounting surface may be one or more of the side surfaces, or the rear surface of a backrest. When the backrest is a backrest of the rear seat 1016, the mounting surface may be located within a cargo area, e.g., a trunk, of the vehicle 1000. In other cases, another interior surface of the cargo area may form the mounting surface for a storage structure.

Figure 2A:
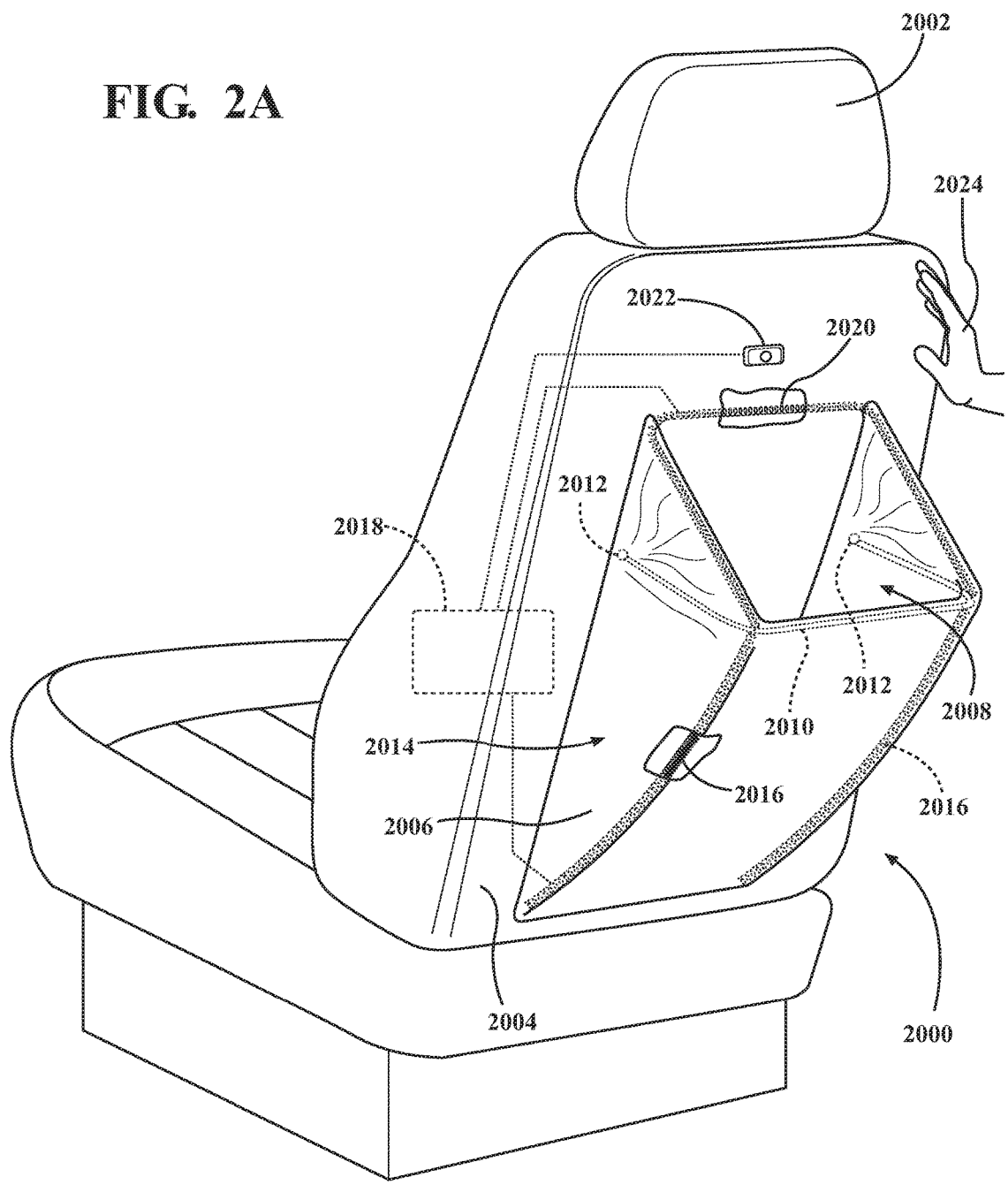
FIG. 2A is a rear view of a seat of a vehicle including an implementation of the storage structure in an open position.
Figure 2B:
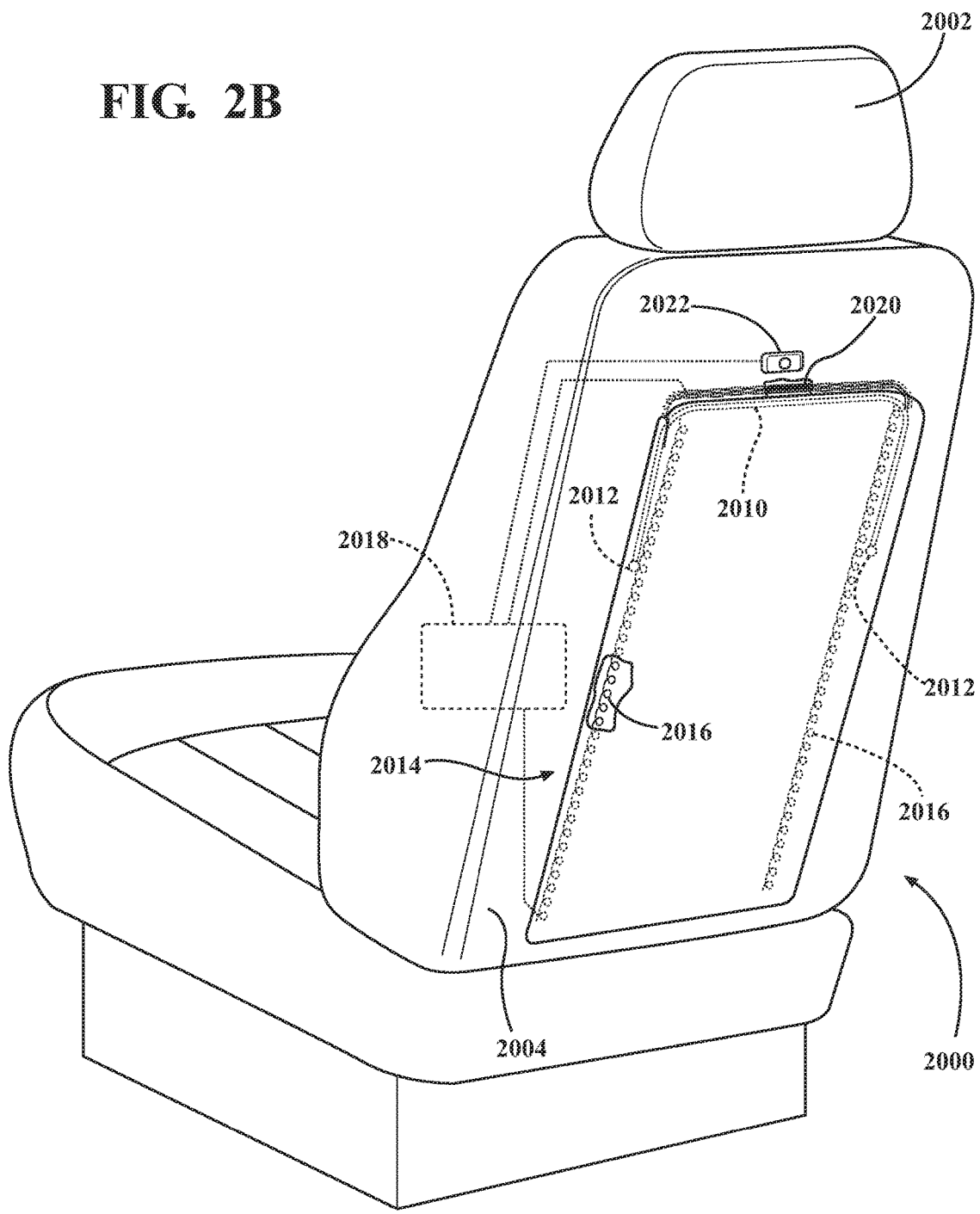
FIG. 2B is a rear view of the seat including the implementation of the storage structure of FIG. 2A in a closed position.

In this example, the storage structure 1020 is affixed to the interior door panel of the front door 1002. Further details of an implementation of a storage structure may be had by reference to FIGS. 2A and 2B. In the implementation of FIGS. 2A and 2B, a storage structure 2000 is affixed to a mounting surface 2004 of a seat 2002. In particular, the mounting surface 2004 is a rear surface of a backrest of the seat 2002.

The storage structure 2000 as shown includes a sheet of material 2006. The material 2006 is not limited, but is desirably flexible. The material 2006 is a flexible fabric in this example. The material 2006 can be one that expands and contracts. The material 2006 may be a dense mesh material. The sheet of material 2006 is secured to the mounting surface 2004 along three sides or edges with an opening or aperture 2008 along the fourth side or edge as shown in FIGS. 2A and 2B, because the sheet of material 2006 is roughly rectangular. In this way, the sheet of material 2006 forms a pocket. The edges may be stitched to the mounting surface 2004 so as to affix the material 2006 to the mounting surface 2004. Other ways to affix the sheet of material 2006 to the mounting surface 2004 are possible.

The dimensions of the sheet of material 2006, and hence the size of the pocket, can depend upon the available space of the mounting surface 2004, the available space at the location within the interior of the vehicle of the storage structure 2000, the flexibility of the material 2006, or a combination of these features. In one example, the sheet of material 2006 has dimensions of 2 feet by 1 feet.

While the material 2006 is described as a single rectangular sheet in this example, the sheet may have a different shape, such as triangular, trapezoidal, etc., shape. As long as one edge or a portion of one edge is available for an opening or aperture, the remaining sides may be secured to form a pocket. The material 2006 may be formed of multiple sheets of different shapes pieced together, such as five sheets—one for the front face of the pocket, two for each of the sides of the pocket below a closure device 2010, and two for each of the sides of the pocket above the closure device 2010.

The closure device 2010 is secured to the sheet of material 2006 at least at an outer end of the closure device 2010 that may include a first outer end and a second outer end extending to opposing ends of the opening 2008. To secure the closure device 2010 to the sheet of material 2006, the closure device 2010 may be stitched, fixedly clipped, glued, etc. to the surface of the pocket. Preferably, the closure device 2010 is secured to the interior surface of the pocket.

Desirably, the closure device 2010 is formed of a rigid material. For example, the closure device 2010 may be a rigid metal wire or may be plastic, such as a rigid Acrylonitrile Butadiene Styrene (ABS) plastic or Nylon plastic. The closure device 2010 has inner ends extending between pivot points 2012 at the mounting surface 2004 that are on opposing sides of the pocket and having the outer end to which the sheet of material 2006 is secured. The pivot points 2012 may rotate about a common axis as shown. A variety of components may be used to implement the pivot points 2012. For example, a first hinge and a second hinge are affixed to the mounting surface 2004 and form the pivot points 2012 in FIG. 2A.

The closure device 2010 may be a rigid arch component that has a semi-circular shape or has a rectangular shape at the outer end. In the example shown, the closure device 2010 is a rigid arch component that has a rectangular shape. A first leg is secured to and extends from a first pivot point of the pivot points 2012 to the outer end and a second leg is secured to and extends from a second pivot point of the pivot points 2012 to the outer end. In this example, the closure device 2010 has an open side at the mounting surface 2004; however, the closure device 2010 may form a closed path with the closure device 2010 extending between the pivot points 2012 underneath the mounting surface 2004 (e.g., within the component of the vehicle that provides the mounting surface).

The storage structure 2000 can also include an actuator assembly 2014 that pivots the closure device 2010 between a first, or closed, position and a second, or open position that allows access to the pocket through the opening 2008. The actuator assembly 2014 includes an actuator 2016 formed of a shape memory material that extends from the closure device 2010 to a bottom of the sheet of material 2006 where the sheet of material 2006 is secured to the mounting surface 2004. The actuator 2016 may also be referred to as a shape memory material actuator 2016 herein. The shape memory material of the actuator 2016 contracts responsive to application of an energy source 2018 to pull the closure device 2010 from the first position to the second position that allows access to the opening 2008. Where the closure device 2010 is the rigid arch component as shown in the example of FIGS. 2A and 2B, the application of the energy source 2018 causes the rigid arch component to pivot about the pivot points 2012 from the closed position where the outer end of the rigid arch component is adjacent to the mounting surface 2004 to close the pocket 2008 as shown in FIG. 2B to the open position that opens the pocket 2008 as shown in FIG. 2A, through a connection of the actuator 2016 to the outer end of the rigid arch component.

The shape memory material may be, for example, a shape memory alloy. The shape memory alloy may be Nitinol, which is a combination of Nickel, Titanium, and active materials. The shape memory material may also be a memory polymer.

The energy source 2018 may be a voltage source or a current source, for example. The energy source 2018 can be any other source that will cause the actuator 2016 to heat so as to contract to a pre-defined shape. The energy source 2018 may also include all of the electronics, such as a microcontroller or other processor device to control the storage structure 2000. In the example shown, the pre-defined shape of the actuator 2016 is a coil shape or a spring shape as discussed in more detail below. The pre-defined shape may be any other shape that will contract the shape memory material into a more compact (e.g., shorter) length in the open position of the closure device 2010 than the length of the shape memory material in the closed position of the closure device 2010.

In the example shown, the actuator 2016 is a first shape memory material actuator and a second shape memory material actuator. The first shape memory actuator extends between the bottom of the pocket and the outer end of the rigid arch component at a first leg, and the second shape memory material actuator extends between the bottom of the pocket and the outer end of the rigid arch component at a second leg.

The storage structure 2000 may include a second actuator 2020 formed of the shape memory material that extends from the mounting surface 2004 to the outer end of the rigid arch component. In the example shown, the second actuator 2020 is a single shape memory material actuator that extends from the outer end near the first leg to the mounting surface 2004 and then to the outer end near the second leg. The second actuator 2020 may also contract responsive to application of the energy source 2018 to shape memory material of the second actuator to close the closure device 2010 from the position in FIG. 2A to the position in FIG. 2B.

In operation, the closed position for the closure device 2010 may be considered the starting position. Responsive to application of the energy source 2018 to the first actuator 2016, the first actuator 2016 contracts to pivot the closure device 2010 (here, the rigid arch component) from the closed position of FIG. 2B to the open position of FIG. 2A. This deforms the shape memory material of the second actuator 2020 from its pre-defined shape, which can be a coil or spring shape. After accessing the pocket through the opening 2008, the pocket can be closed. More specifically, application of the energy source 2018 to the second actuator 2020 contracts to pivot the closure device 2010 from the open position of FIG. 2A to the closed position of FIG. 2B. The second actuator 2020 contracts to its pre-defined shape in the direction of the arrow in FIG. 2A, and the first actuator 2016 deforms out of its pre-defined shape. This process can be repeated each time there is a desire to access the storage structure 2000.

The second actuator 2020 is shown as a single length of the shape memory material. However, this is not a requirement. The second actuator may be two or more shape memory material actuators arranged at opposing ends of the outer end of the closure device 2010. In FIGS. 2A and 2B, the energy source 2018 is not shown with electrical connections to the first actuator 2016 and the second actuator 2020 for clarity. The energy source 2018 may be electrically coupled by any type of connection. Further, a single energy source 2018 is shown. More than one energy source 2018 is possible, where each is electrically coupled to one or more shape memory material actuators forming the first actuator 2016 or the second actuator 2020.

Optionally, the second actuator 2020 is not included. In an alternative embodiment, the second actuator 2020 is replaced with one or more springs that extends between the outer end of the closure device (e.g., the rigid arch element) and the mounting surface 2004. For example, where the pivot points 2012 are formed by first and second hinges, the spring may be a first spring located at the first hinge and a second spring located at the first hinge. In either case, the spring(s) may be biased to pivot the rigid arch component into the closed position of FIG. 2B. In operation, the energy source 2018 may be applied to the first actuator 2016 to open the pocket, and maintain the pocket in its open position. When the energy source 2018 is no longer applied to the first actuator 2016, the biasing of the spring(s) pivots the closure device 2010 to the closed position of FIG. 2B.

FIG. 2A also includes a motion sensor 2022 that is optionally controlled by the energy source 2018. The motion sensor 2022 is affixed to the mounting surface 2004. The motion sensor 2022 is configured to actuate an actuator of the actuator assembly 2014 responsive to detection of motion. The motion may be motion by a user 2024. Alternatively, or additionally, the actuator assembly 2014 may be operated using a time-sensitive sensor. For example, the actuator assembly 2014 may be opened or closed at defined times during a 24-hour period.

FIGS. 2A and 2B show the first actuator 2016, the second actuator 2020, the closure device 2010, and the pivot points 2012 through the material 2006 for illustrative purposes only. Each of the first actuator 2016, the second actuator 2020, the closure device 2010, and the hinges or other components forming the pivot points 2012 are concealed by the material 2006.

Figure 3:
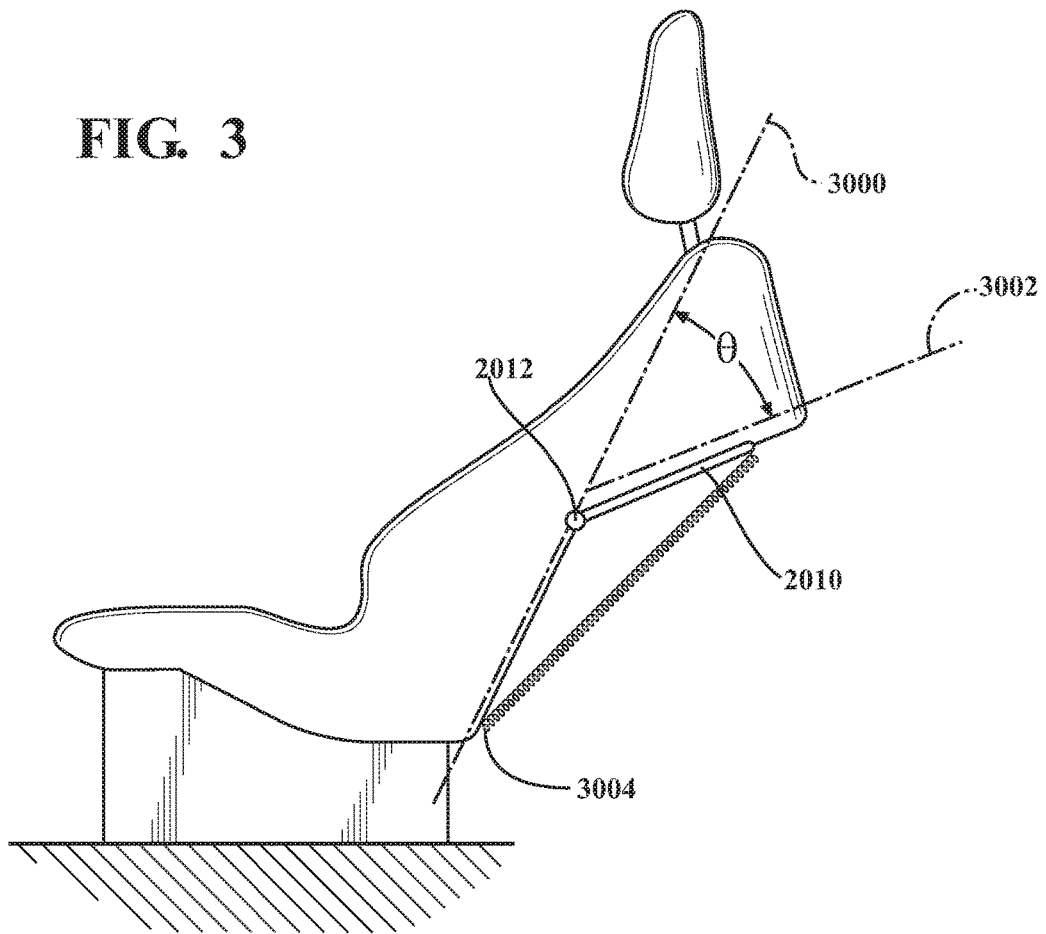
FIG. 3 is a side view of another seat of a vehicle including an implementation of the storage structure in a closed position.

In the examples of FIGS. 1, 2A, and 2B, the mounting surface is a substantially flat surface, and the open position of the rigid arch component is about 90 degrees relative to the mounting surface. The shape memory material starts to pull the closure device 2010 down from the closed position, where the closed position is at a 0 degree position. This position is parallel to the line 3000 shown in FIG. 3. In some cases, it may be desirable to use a mounting surface that is angled so as to reduce a force required to move the rigid arch component from the closed position to the open position as compared to a force required to move the rigid arch component from the closed position to the open position when the rear surface is a substantially flat surface. This may be achieved by a curved or angled mounting surface (e.g., a seatback). In such an arrangement, the mounting surface towards the top of the pocket is tilted further back than the mounting surface towards the bottom of the pocket. In the example of the angled seatback of FIG. 3, the pivot points 2012 are located where the angle of the seatback changes. The seatback shifts by an angle θ so that the closed position of the closure device 2010 is parallel to the line 3002. Assuming that the angle θ is 30 degrees, the force used by the shape memory material of the actuator 3004 to pull the closure device 2010 from 30 degrees to 40 degrees and then to the open position (at about 90 degrees relative to the line 3000) is likely less than the force used by the shape memory material of the actuator in FIGS. 1, 2A, and 2B to pull the closure device 2010 from 0 degrees to 10 degrees and then to the open position.

Figure 4:
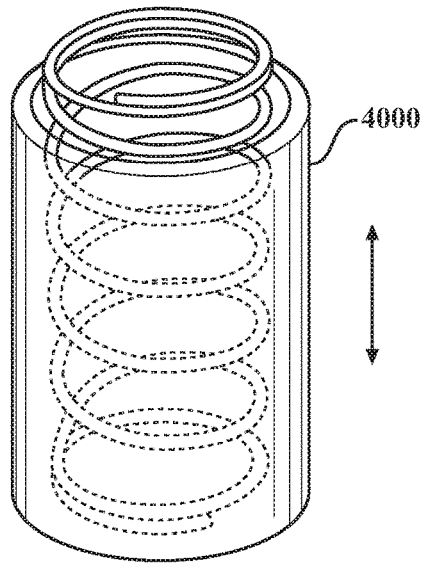
FIG. 4 is a partial side view of an insulator tube surrounding the shape memory material of a storage structure.

Due to the application of an energy source to the shape memory material, the shape memory material increases in temperature. In some cases, it may be desirable to provide insulation for the shape memory material. FIG. 4 shows a flexible tube 4000 made of an insulating material. The flexible tube 4000 surrounds the shape memory material of an actuator so as to space the actuator from the material of the storage structure, such as the sheet of material 2006. The flexible tube 4000 may be open at opposing ends so that the shape memory material can have one end forming an electrical connection for activation of the actuator through the mounting surface 2004, and the other end secured to the closure device 2010 so that the actuator can move the closure device 2010. The insulating material is flexible so that it can contract and expand in the direction of the arrow with the contraction and deformation of the shape memory material. As in the example of FIGS. 2A and 2B, the shape memory material is arranged in a coil shape.

Figure 5:
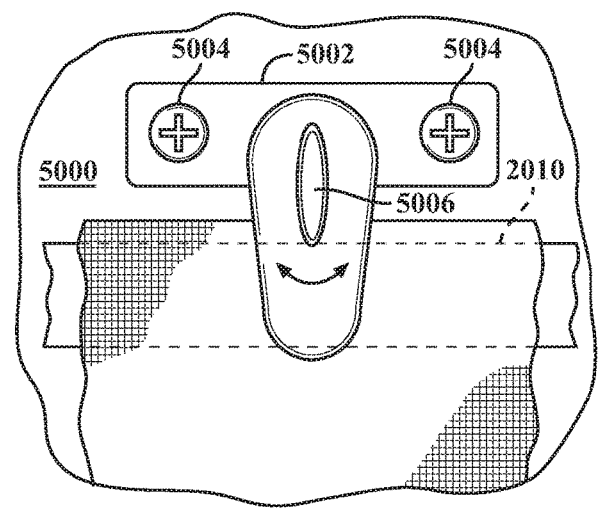
FIG. 5 is a front view of an example of a latch for the storage structure.

Although not shown in FIGS. 2A and 2B, a latch may be located on the mounting surface 2004 near an apex of the closure device 2010 when the closure device 2010 is in the closed position. In this way, the latch may secure the closure device 1010 in the closed position as shown in FIG. 2B. The latch may be a manually-operated latch, or may be an automated latch, for example, a magnetic latch that is released when the actuator assembly is activated to move the closure device 2010 to the open position from the closed position. One example of a latch 5000 is shown in FIG. 5. The latch 5000 is a manually-operated latch that has a plate 5002 secured to the mounting surface by two bolts 5004 and a moveable portion 5006 extending from the plate 5002 that can be pivoted to secure the closure device 2010, here the rigid arch component, and to release the closure device 2010. The latch 5000 can be made of any material or combination of materials that is strong enough to support weight applied to the storage structure 2000 by its contents without bending.

While the description herein is made with respect to specific implementations, it is to be understood that the invention is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle, comprising:
   a mounting surface within an interior of the vehicle; and
   a storage structure affixed to the mounting surface, the storage structure comprising:
   a sheet of material secured to the mounting surface and forming a pocket for the mounting surface;
   a rigid arch component having inner ends pivotally connected at pivot points to the mounting surface at respective opposing sides of the pocket and the rigid arch component extending radially outward from an axis of the pivot points to an outer end to which the sheet of material is secured; and
   an actuator assembly comprising an adjustable length actuator coupled to the outer end of the rigid arch component and configured to cause pivoting movement of the rigid arch component, wherein the rigid arch component pivots about the pivot points between a closed position where the outer end of the rigid arch component is adjacent to the mounting surface to close the pocket and an open position that opens the pocket.

2. The vehicle of claim 1, wherein the adjustable length actuator is formed of a shape memory material that extends from a bottom of the pocket to the outer end of the rigid arch component, the shape memory material contracting responsive to application of an energy source to pivot the rigid arch component from the closed position to the open position.

3. The vehicle of claim 2, wherein the shape memory material comprises a shape memory alloy that contracts into a spring shape when the energy source is applied.

4. The vehicle of claim 2, wherein the energy source is a voltage applied to the shape memory material.

5. The vehicle of claim 2, wherein the actuator assembly comprises:
   a spring extending between the outer end of the rigid arch component and the mounting surface, the spring biased to pivot the rigid arch component into the closed position.

6. The vehicle of claim 5, further comprising:
   a first hinge and a second hinge affixed to the mounting surface and forming the pivot points, the spring comprising a first spring located at the first hinge and a second spring located at the first hinge.

7. The vehicle of claim 2, wherein:
   the actuator is a first actuator,
   the actuator assembly comprises a second actuator formed of the shape memory material that extends from the mounting surface to the outer end of the rigid arch component, the shape memory material of the second actuator deforming responsive to the application of the energy source to the shape memory material of the first actuator and contracting responsive to application of the energy source to pivot the rigid arch component from the open position to the closed position, and
   the shape memory material of the first actuator deforms responsive to the application of the energy source to the shape memory material of the second actuator.

8. The vehicle of claim 2, further comprising:
   a flexible tube made of an insulating material and surrounding the shape memory material of the actuator so as to space the actuator from the sheet of material.

9. The vehicle of claim 1, wherein the rigid arch component has one of a semi-circular or rectangular shape.

10. The vehicle of claim 1, further comprising:
    a motion sensor affixed to the mounting surface, the motion sensor configured to actuate an actuator of the actuator assembly responsive to detection of motion.

11. The vehicle of claim 1, wherein:
    the mounting surface is a substantially flat surface, and the open position of the rigid arch component is 90 degrees relative to the mounting surface.

12. A vehicle, comprising:
    a vehicle component forming a mounting surface within an interior of the vehicle; and
    a storage structure affixed to the mounting surface, the storage structure comprising:
    a sheet of material secured to the mounting surface along three sides of the sheet of material and having an aperture along a fourth side of the sheet of material;
    a closure device having a first inner end and a second inner end pivotally supported on the mounting surface for rotation about a pivot axis, the closure device secured to the sheet of material and having a first outer end and a second outer end radially outward of the pivot axis, and the closure device extending horizontally in a direction along the aperture; and
    an actuator assembly comprising an actuator formed of a shape memory material that extends from at least one of the first outer end or the second outer end of the closure device to a bottom of the sheet of material where the sheet of material is secured to the mounting surface, the shape memory material contracting responsive to application of an energy source to pull the closure device from a first position that closes the aperture to a second position that allows access through the aperture.

13. The vehicle of claim 12, wherein:
    the mounting surface is a rear surface of a seatback of a seat; and
    the aperture extends horizontally across the seatback.

14. The vehicle of claim 13, wherein the rear surface of the seatback is angled to reduce a force required to move the closure device from the first position to the second position as compared to a force required to move the closure device from the first position to the second position when the rear surface is a substantially flat upright surface.

15. The vehicle of claim 12, further comprising:
a latch located on the mounting surface to secure the closure device in the first position.

16. The vehicle of claim 12, wherein:
the closure device forms a rigid arch component having two legs extending from the first outer end and the second outer end to respective pivot point connections with the mounting surface, and
the actuator comprises a first actuator that extends from the first outer end to the bottom of the sheet of material and a second actuator that extends from the second outer end to the bottom of the sheet of material.

17. The vehicle of claim 12, wherein the sheet of material comprises a flexible fabric.

\* \* \* \* \*